United States Patent [19]

Roberts et al.

[11] 4,065,299
[45] Dec. 27, 1977

[54] MAGNESIUM RECLAMATION PROCESS AND APPARATUS

[75] Inventors: Gregory Todhunter Roberts, Walnut; David Vincent Owens, Anaheim; Raymond Frank Goodspeed, Garden Grove, all of Calif.

[73] Assignee: Teledyne Industries, Inc., Los Angeles, Calif.

[21] Appl. No.: 625,150

[22] Filed: Oct. 23, 1975

[51] Int. Cl.² ............................................. C22B 26/22
[52] U.S. Cl. ......................................... 75/67 A; 75/3; 75/5; 264/111; 425/78; 425/416; 425/451.9
[58] Field of Search ................ 75/3, 4, 5, 67 R, 67 A, 75/200; 264/111; 29/403, 420; 228/115, 219, 178; 428/78

[56] References Cited

U.S. PATENT DOCUMENTS

| | | | |
|---|---|---|---|
| 2,310,188 | 2/1943 | Hansgirg | 75/67 |
| 2,358,667 | 9/1944 | Stern | 75/200 |
| 2,485,128 | 10/1949 | Adams | 75/67 |
| 2,493,391 | 1/1950 | Chew | 75/67 |
| 2,620,269 | 12/1952 | Haney et al. | 75/67 |
| 3,166,415 | 1/1965 | Conant | 75/200 |
| 3,441,402 | 4/1969 | Magee et al. | 75/67 |
| 3,634,066 | 1/1972 | Matthews et al. | 75/67 |
| 3,843,355 | 10/1974 | Reding | 75/67 |

Primary Examiner—L. Dewayne Rutledge
Assistant Examiner—Michael L. Lewis
Attorney, Agent, or Firm—Blakely, Sokoloff, Taylor & Zafman

[57] ABSTRACT

A magnesium reclamation process whereby magnesium and magnesium alloy fines, chips and scraps may be recovered and remelted for reuse. The method is comprised of the steps of pelletizing the magnesium by first compacting the magnesium with a low pressure press so as to initially expel the majority of the air, followed by a high pressure press under a controlled environment to form a compact pellet. The pellets are then melted either by stacking on the cold heel of a pot and heating under a controlled environment or pre-heating in a basket over a melt, and then subsequently immersing the load. Melting can also be accomplished by controlled melting, utilizing an induction melting furnace whereas temperature can be slowly increased. Pelletizing pressures range from approximately the yield pressure to the cold welding pressure of the material being reclaimed. A typical pelletizing environment is 20% $SF_6$ and 80% $CO_2$ and a suitable melting environment is 98% $CO_2$ and 2% $SF_6$.

24 Claims, 3 Drawing Figures

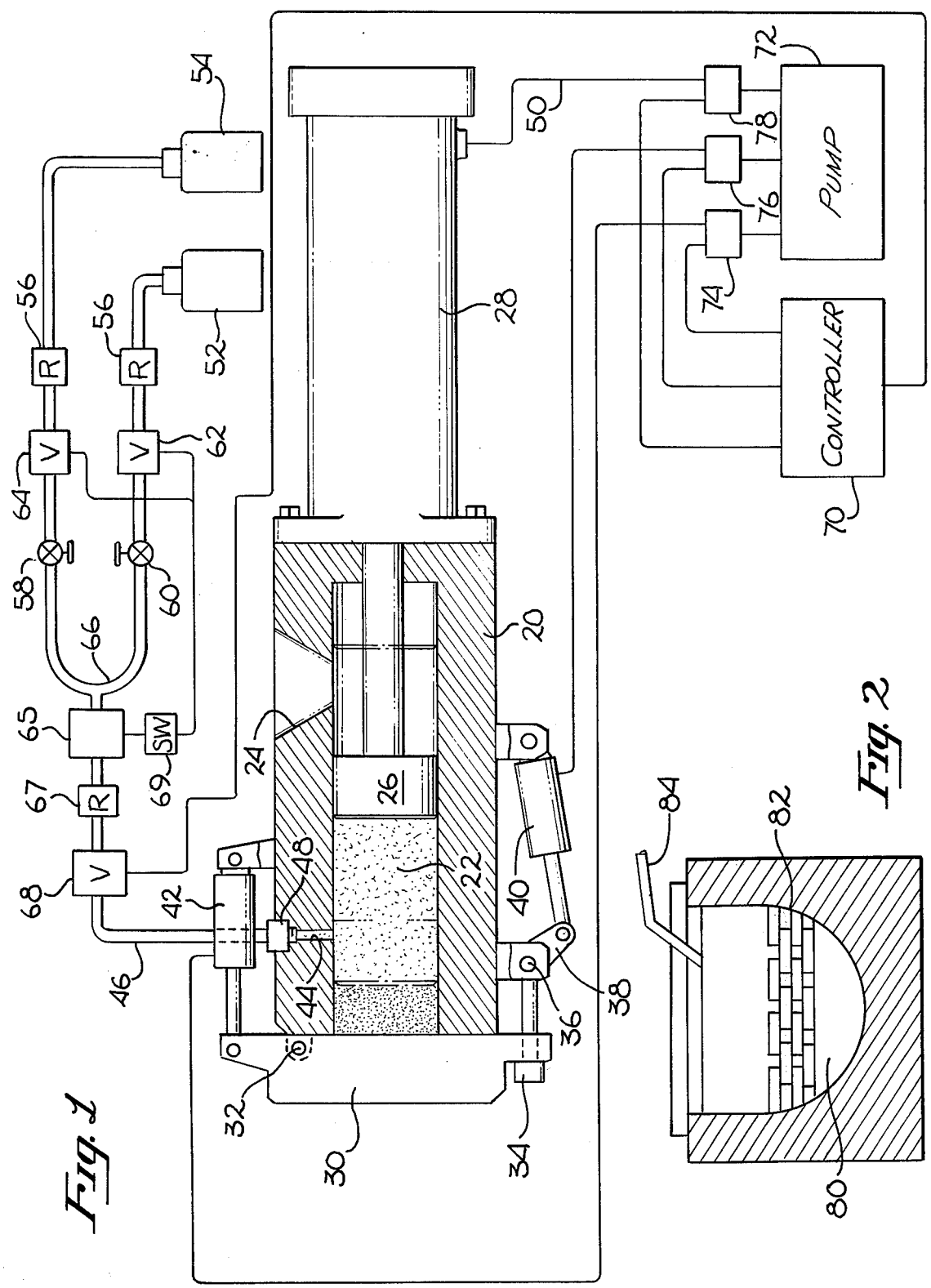

MAGNESIUM RECLAMATION PROCESS AND APPARATUS

BACKGROUND OF THE INVENTION

1. Field of the Invention

The present invention relates to the field of recovery of scrap metals, and more particularly to the recovery and remelting of magnesium and magnesium alloy fines, chips and scraps.

2. Prior Art

Magnesium has been used in very substantial quantities for many years, both in the nearly pure form and in high magnesium content alloys. Though magnesium and high magnesium content alloys (hereinafter simply magnesium) present a very substantial fire hazard, machine shop and other processing operations for controlling the likelihood of occurrence of fires are well known, and consequently magnesium castings, machined parts and parts formed of other processes are commonly used in applications requiring the special properties of low density and a high strength to weight ratio. However, in spite of the routine use of magnesium for many years, no really satisfactory method of disposing of magnesium fines, chips and scraps has been found prior to the present invention. Accordingly machine shops and other operations processing magnesium have the constant problem of disposing of the waste magnesium, and have no practical way of recovering the magnesium for reuse.

One method which has been proposed in that of U.S. Pat. No. 3,634,066. In this method scrap metal particles and placed in an enclosed receptacle mounted above a molten metal bath. The receptacle is emerged in the molten bath such that either the base wall or a removable cover of the receptacle is submerged below the surface of the bath. The molten metal reacts with the atmosphere in the receptacle to create a partial vacuum, drawing molten metal into the receptacle to melt the scrap particles therein. The receptacle is then raised above the level of the metal bath to allow the melt to drain through the openings in the receptacle. This method overcomes the problem of attempting to maintain a flux or suitable gaseous environment around the bulky and very low effective density scrap metal during melting by confining the scrap in an oxidizing environment of limited capacity. However, it has various disadvantages which make its use difficult, particularly when the scrap must be transported for remelting. In particular, the disclosed method is directed only toward the remelting problem and does not include any method for storage or transportation in a manner to minimize the extent of oxidation which may occur by reaction with the environment and to minimize the possibility of fire. Also, the disclosed method purposely causes a reaction between a limited environment and the metal. Though volume of such reacting atmosphere is not large, the aggregate density of the metal chips typically is very low, so that a significant percentage material is lost through oxidation. Of course, the scrap must be substantially free of volatile contaminants such as moisture, cutting oils, etc., as a positive pressure in the receptacle creates problems not only in the receptacle, but with respect to the flux layer or controlled environment over the molten metal in the pot itself. The disclosed method has the further diadvantage of effectively increasing the effective crucible area exposed to the molten metal, thereby increasing the rate of contamination of the molten metal from this source.

BRIEF SUMMARY OF THE INVENTION

A magnesium reclamation process and apparatus whereby magnesium and magnesium alloy fines, chips and scraps may be recovered and remelted for reuse. The preferred method is comprised of the steps of pelletizing the magnesium by placing the magnesium in a press, pressing the magnesium at a low pressure so as to initially expel the majority of the air, withdrawing the pressing element while filling the increasing volume with a controlled environment and finally pressing with a high pressure, preferably exceeding the yield pressure of the magnesium, under the controlled environment to form a compact self-supporting pellet. The pellets are then melted by such processes as stacking on the cold heel of a melting pot and heating under a controlled environment, or pre-heating in a basket over a melt and subsequently immersing into the melt. This can also be accomplished in an induction furnace with controlled environment. Pelletizing pressures range preferably from the yield pressure to the cold welding pressure of the material being reclaimed, with a pressure of approximately 40,000 p.s.i. being preferred. A typical pelletizing environment is 20% $SF_6$ and 80% $CO_2$ and a suitable melting environment is 98% $CO_2$ and 2% $SF_6$.

BRIEF DESCRIPTION OF THE DRAWINGS

FIG. 1 is a partial cross section of the preferred embodiment of compactor of the present invention.

FIG. 2 is a schematic representation showing the manner of melting the pellets.

DETAILED DESCRIPTION OF THE INVENTION

Figure 3:
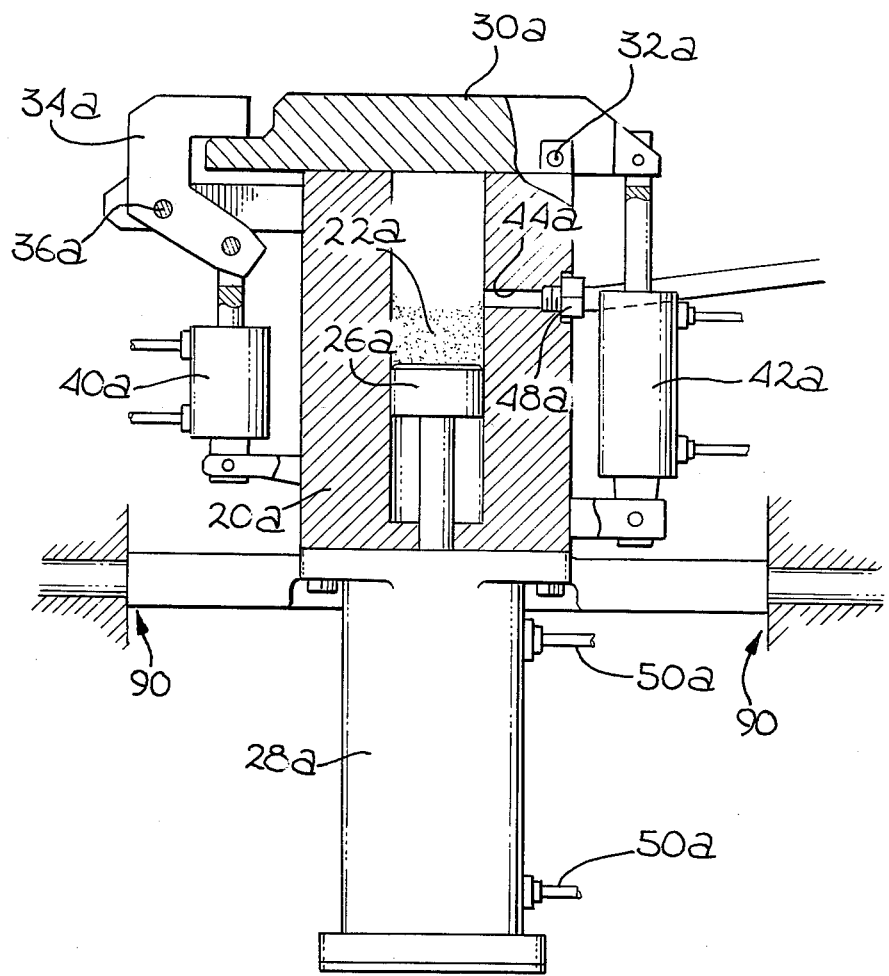
FIG. 3 is a schematic representation of an alternate embodiment compactor.

The present invention comprises a method and apparatus for the recovery and remelting of magnesium fines, chips and scrap in a safe, efficient and practical manner. The invention is particularly useful for the recovery of what otherwise would comprise magnesium waste from machine shops and the like, wherein the magnesium waste may include relatively fine powders, milling and turning chips and other forms of scrap in varied mixes, often having a low aggregate density.

The invented process comprises two major steps. These are first, the compacting or pelletizing of the magnesium into pellets or wafers having a density approaching that of the solid material, and second, the remelting of the pellets under controlled conditions to minimize oxidation and provide maximum recovery thereof. As shall subsequently be seen, these steps are each carried out in such a way as to allow the efficient recovery of magnesium in quantity, thereby not only solving the problems of disposal, but also providing direct economic incentives for recovering magnesium by this method.

Now referring to FIG. 1, a schematic representation of the compactor or pelletizer of the present invention may be seen. The compactor has a housing 20 defining a cylindrical chamber 22 which may receive the magnesium fines, chips and scraps through an opening 24 at one end thereof when the piston 26 is withdrawn by the hydraulic cylinder 28. A door 30 supported on pivots 32 closes the opposite end of chamber 22, with the door being retained in the closed position by a lock 34 pivotally supported from the housing 20 by pivot 36. The assembly comprising lock 34 contains an arm 38 driven by a small hydraulic cylinder 40 so as to controllably rotate the lock 34 from the locked position as shown in the figure to a lower unlocked position. Also the door itself may be driven in rotation by a third hydraulic cylinder 42 coupled between the housing 20 and the door 30 at a position above the pivot 32.

At a position adjacent to door 30 is a vent 44 extending to a line 46 for providing a controlled environment to the cavity 22. Preferably a one-way valve 48 (a ball valve or the like) is disposed adjacent to vent 44 to prevent reverse flow through the line.

The pelletizing in the preferred embodiment is actually a three step process. After the pelletizer is loaded with a charge through opening 24, hydraulic cylinder 28 is activated with a low pressure so as to force the magnesium particles to the end of the cylinder adjacent door 30, providing some minor initial compaction of the more fragile chips such as turnings and the like, and expelling the majority of the air from the chamber or cylinder. In this regard it should be noted that while door 30 provides a closure of one end of the cylinder, it is not an air-tight closure so that the air in the cylinder may pass between the door and the end of the cylinder as the piston advances. If desired, some vents may be made in the door 30 to further relieve any air pressure which would tend to build up, though it has been found that such additional vents typically are not required.

The purpose of this first compression is to expel the majority of the air from the cylinder and to collect the magnesium particles at one end of the cylinder. Since the atmosphere surrounding the magnesium during this first compression is air and therefore an oxidizing environment, this first compression should be carried out with negligible heating and friction with the particles. Thus, the pressure of this first compression should not exceed 15,000 p.s.i. through a pressure as low as 5,000 p.s.i. or even lower is adequate.

When the pressure in the hydraulic line 50 supplying hydraulic cylinder 28 reaches a pressure indicative of the desired low pressure on the magnesium particles, the motion of piston 26 is reversed and an inert atmosphere is provided to the then expanding volume of chamber 22 through line 46. In the preferred embodiment a mixture of $SF_6$ and $CO_2$ is used, with a mixture by volume of 20% $SF_6$ and 80% $CO_2$ being most preferred. Thus for this purpose standard gas cylinders 52 and 54 containing each of the gases may be used, with a regulator 56 on each tank dropping the output pressure thereof to a few p.s.i. over atmospheric to insure suitable flow. The flow rates in each line may be adjusted with adjustable valves 58 and 60, and turned on and off with solenoid control valves 62 and 64 in each of the gas delivery lines. The two gases are fed to a mixer tank 65, and through a regulator 67 and main solenoid valve 68, to assure proper mixing of the two gases prior to delivery into the chamber 22. In the preferred embodiment the pressure at the mixer tank is controlled by the pressure switch 69, and should cycle between 85–110 p.s.i. The regulator 67 should be set at approximately 30 p.s.i. The main solenoid valve 68 is coupled to the controller 70.

After the initial compression, the piston is withdrawn and the gas provided into the increasing chamber volume as described above, with the piston retracting to a position not quite exposing the opening 24, thus avoiding the opportunity of contamination of the new environment in the chamber with the surrounding air (since the $CO_2$–$SF_6$ mixture is heavier than air, little contamination would occur any way unless there were substantial drafts in the region of the compactor). At this point in the piston travel the piston motion is again reversed to extend toward the door 30, and the flow of gas is shut off by shutting off the main solenoid valve 68. While the piston motion tends to increase the pressure of the gas in chamber 22, the one-way valve 48 prevents back-flow of the gas into line 46 so that the gas must necessarily penetrate and permeate the magnesium against door 30, and incidentally leak out around the door. Consequently when the piston 26 starts the high pressure compaction of the magnesium the initial air atmosphere around the magnesium particles has been replaced by the $CO_2$–$SF_6$ mixture. Accordingly a high pressure compaction may now be carried out without risk of fire from the heat and friction of the compaction. In order to insure suitable compaction and the desired resulting self-supporting pellet, a compaction pressure which is higher than the yield strength of the magnesium should be used. By way of specific example, a compaction pressure of approximately 40,000 p.s.i. has been found to provide the desired result. Higher pressures could also be used, although there is little advantage in attempting to exceed the cold welding pressure for the magnesium, as the process is intended to be readily used for the recovery of magnesium fines, chips and scraps of various vintages and histories, and accordingly the extent of cold welding could be expected to be random and poor because of the presence of oxides, cutting oils, and other contaminates in the mix.

At the end of the high pressure compaction, the force on piston 26 is relieved, lock 34 is released and door 30 opened. Piston 26 is then further extended to expel the resulting pellet, and withdrawn for loading of another charge.

In the preferred embodiment a cylinder having an inner diameter of approximately three inches is used, and pellets of good density uniformity have been achieved having lengths of up to three inches. Above this length however, resulting pellets have poor self-supporting characteristics and more non-uniformity in density than desired. Consequently it is believed that, at least for the pressure stated, best results will be achieved if the resulting pellet length is kept equal to or less than the diameter of the pellet. Also while the pellets are self supporting, they are not particularly structurally sound. Therefore, when being ejected from the cylinder, friction between the pellet and the cylinder walls may cause some chattering of the pellet and dislodging of the surface particles from the exposed pellet face. This may be avoided or at least minimized by providing a slight tapering of the cylinder to a larger diameter adjacent the door and/or the use of a non-contaminating lubricant on the cylinder walls, such as a silicon oil. Inasmuch as the best location for port 44 and the best location for the start of the taper in the chamber adjacent the door depend upon the length of the pellet being formed, best results are obtained if the amount of magnesium per pellet is reasonably well controlled, such as by a rough weighing of the charge or by holding the volume of the charge constant.

In the preferred embodiment the cycle is automatically controlled by a controller 70 controlling the output of a hydraulic pump 72 through valves 74, 76, and 78, which control the main cylinder 28 and the door actuators 42 and 40. The controller 70 also provides a signal to control the main solenoid valve 68 to provide automatic control of the gas mixture supply. In this regard $SF_6$ is an expensive gas, and while it should be used in sufficient quantities to minimize the fire hazards, the automatic control of the gas will avoid any unnecessary excess use thereof. The complete cycle, once initiated, is completed in approximately 20 seconds so that an output of approximately two pellets 3-inch diameter by 3-inch long per minute may be achieved. Thus the system and process is not only effective in solving the previously existing disposal problems, but in addition is cost effective purely as a reclamation process.

The pellets may be readily remelted using a number of techniques. In the preferred embodiment the pellets are stacked on the cold heel 80 of a conventional melting pot 82, and then melted in the presence of a controlled environment directed into the pot through line 84. In the preferred embodiment the controlled environment (e.g., inert atmosphere) injected through line 84 is again a mixture of $SF_6$ and $CO_2$, with a mixture in the range of 2% to 4% $SF_6$ being suitable. Such a mixture assures adequate $SF_6$ in the presence of the molten metal while minimizing the amount of $SF_6$ that is consumed. Alternate methods of melting the pellets include the suspension of the pellets in a basket over the surface of molten metal in a melting pot so as to allow the gradual heating and melting of the pellets (again in the presence of the $SF_6$ and $CO_2$ mixture). While melting using flux techniques could be used, such techniques are not preferred because of the difficulty in handling the flux to avoid oxidation of the pellets and because of undesirable wetting of the surface by flux as well as flux inclusions. Flux also creates an undesirable expulsion of vapor into the atmosphere. In that regard, it should be noted that the present invention may be utilized for the reclamation for magnesium fines, chips and scraps which may have volatile contaminants thereon, such as cutting oils and the like while volatiles are given off during the heating of the pellets. Similarly, in theory the compaction could be carried out under other environments or in a conventional air environment. However, it has been found that the use of an air environment results in a possible dieseling effect under the compaction pressures caused by the reaction of the contaminants with the oxygen in the atmosphere, an obviously highly undesirable phenomenon which is eliminated with a controlled environment, particularly with the $SF_6$-$CO_2$ mixture disclosed herein.

There has been described herein the preferred embodiment of a magnesium reclamation process and apparatus which results in the cost effective recovery of magnesium fines, chips and scraps commonly generated by machine shops and the like which heretofore have presented severe disposal problems. Of course, alternate methods of practicing the basic concepts of the present invention or alternate apparatus may be used. By way of example, other methods of purging the air around the magnesium and controlling the environment prior to pressing into a pellet may be used, such as vacuum techniques or flow techniques, though the technique herein disclosed in detail is preferred. Similarly the press itself may be of other construction and may be manually operated rather than automatically operated. By way of further example, an alternate embodiment for the press or compactor may be seen in FIG. 3. (The various parts of the embodiment of FIG. 3 identified by numeral followed by the small letter *a* have the same function and purpose as the parts of the embodiment of FIG. 1 identified by the same numeral.) This embodiment utilizes a generally vertical orientation which has a number of advantages. In particular, it allows the elimination of the loading port 24 of the embodiment of FIG. 1, as loading may be readily achieved through the door 30a at the top end of the cylinder. Following loading the entire assembly is rotated 180° about pivots 90 prior to compaction, so that the charge will fall against door 30a. The generally vertical orientation coupled with the loading through the door 30a provides a more uniform loading of the uncompacted material, resulting in a more uniform pellet from the compaction process and perhaps allowing compaction of a larger pellet while still maintaining the desired uniformity in characteristics. This orientation is particularly advantageous when compacting rather fine material as the embodiment of FIG. 1 tends to result in the initial collection of the material at one side of the cylinder prior to compaction, encouraging a less uniform pellet unless pellet size is limited. Thus, while the present invention has been disclosed and described in detail herein with respect to a preferred embodiment thereof, it will be readily understood by those skilled in the art that various changes in form and detail may be made therein without departing from the spirit and scope of the invention.

We claim:

1. A method of compacting magnesium fines, chips and scraps comprising the steps of:
   a. placing the magnesium in the confined chamber of a press,
   b. pressing the magnesium at a low pressure to collect the magnesium at one end of the confined chamber and to expel a substantial portion of the air in the chamber,
   c. withdrawing the pressing element while providing an inert atmosphere in the increasing chamber volume, and
   d. pressing the magnesium at a high pressure to concentrate the magnesium into a self supporting pellet.

2. The method of claim 1 comprised of the further step of releasing the pressure on the pressing element, opening the end of the chamber opposite the pressing element, and advancing the pressing element to eject the pellet.

3. The method of claim 1 wherein said low pressure is less than 15,000 psi.

4. The method of claim 1 wherein said high pressure is higher than the yield strength of the magnesium.

5. The method of claim 1 wherein said high pressure is approximately 40,000 psi.

6. The method of claim 1 wherein the inert atmosphere is a mixture of $CO_2$ and $SF_6$.

7. The method of claim 6 wherein the mixture is approximately 80% $CO_2$ and 20% $SF_6$ by volume.

8. A method of compacting magnesium fines, chips and scraps comprising the steps of:
   a. placing the magnesium in the cylinder of a press having a closure member at a first end thereof and a piston extendable into the cylinder from the second end of the cylinder, the closure of the cylinder at the first end being pervious to gases,
   b. extending the piston with a low pressure to collect the magnesium at the first end of the cylinder and to expel a substantial portion of the air in the cylinder,
   c. withdrawing the piston while injecting an inert atmosphere into the cylinder adjacent to the first end of the cylinder at a rate at least equal to the rate of increase of volume of the cylinder, d. extending the piston with a high pressure to concentrate the magnesium into a self supporting pellet.

9. The method of claim 8 comprised of the further step of releasing the pressure on the magnesium, opening the closure member at the first end of the cylinder, and extending the piston to eject the magnesium pellets.

10. The method of claim 8 wherein said low pressure does not exceed 15,000 psi.

11. The method of claim 8 wherein said high pressure is higher than the yield strength of the magnesium.

12. The method of claim 8 wherein said high pressure is approximately 40,000 psi.

13. The method of claim 8 wherein the inert atmosphere is a mixture of $CO_2$ and $SF_6$.

14. The method of claim 8 wherein the mixture is approximately 80% $CO_2$ and 20% $SF_6$ by volume.

15. A method of recovering magnesium fines, chips and scraps comprising the steps of:

a. initially compacting the magnesium fines, chips and scraps at a low pressure to expel a substantial portion of the air surrounding the magnesium;

b. subjecting the initially compacted magnesium to a first inert atmosphere and pressing the magnesium into pellets with a pressure exceeding the yield pressure of the magnesium; and c. heating the magnesium pellets in a second inert atmosphere to melt the pellets.

16. The method of claim 15 wherein the first and second inert atmospheres comprise a mixture of $CO_2$ and $SF_6$.

17. The method of claim 16 wherein the first inert atmosphere is approximately 80% $CO_2$ and 20% $SF_6$ by volume.

18. The method of claim 16 wherein said second inert atmosphere contains, by volume, $SF_6$ in the range of 2% to 4%.

19. The method of claim 15 wherein steps (a) comprises the following individual steps:

a. and (b) placing the magnesium in the cylinder of a press having a closure member at a first end thereof and a piston extendable into the cylinder from the second end of the cylinder, the closure of the cylinder at the first end being pervious to gases, b. extending the piston with a low pressure to collect the magnesium at the first end of the cylinder and to expel a substantial portion of the air in the cylinder, c. withdrawing the piston while injecting an inert atmosphere into the cylinder adjacent to the first end of the cylinder at a rate at least equal to the rate of increase of volume in the cylinder, 'd. extending the piston with a high pressure to concentrate the magnesium into a self supporting pellet.

20. The method of claim 15 wherein step (c) comprises the following individual steps:

a. stacking the pellets on the heel of a cold magnesium melting pot, b. providing the inert atmosphere in the pot, and, c. heating the pot to melt the heel and magnesium pellets.

21. A method of recovering magnesium fines, chips and scraps comprising the steps of:

a. placing the magnesium in the cylinder of a press having a closure member at a first end thereof and a piston extendable into the cylinder from the second end of the cylinder, the closure of the cylinder at the first end being pervious to gases, b. extending the piston with a low pressure to collect the magnesium at the first end of the cylinder and to expel a substantial portion of the air in the cylinder, c. withdrawing the piston while injecting a mixture of $CO_2$ and $SF_6$ into the cylinder adjacent to the first end of the cylinder at a rate at least equal to the rate of increase of volume in the cylinder, d. extending the piston with a high pressure to permeate the magnesium with the $CO_2$–$SF_6$ mixture and to concentrate the magnesium into a self supporting pellet.

e. ejecting the pellet from the cylinder and placing the pellet on the heel of a cold magnesium melting pot, f. injecting an atmosphere of a mixture of $CO_2$ and $SF_6$ into the pot and, g. heating the pot to melt the heel and pellet.

22. The method of claim 21 wherein the mixture used in step (f) contains 1% to 2% $SF_6$ by volume.

23. The method of claim 21 wherein the mixture of step (c) contains at least 5% $SF_6$ by volume.

24. A method of recovering magnesium fines, chips and scraps comprising the steps of:

a. placing the magnesium in the cylinder of a press having a closure member at a first end thereof and a piston extendable into the cylinder from the second end of the cylinder, the closure of the cylinder at the first end being pervious to gases;

b. extending the piston with a low pressure to collect the magnesium at the first end of the cylinder and to expel a substantial portion of the air in the cylinder;

c. withdrawing the piston while injecting an inert atmosphere into the cylinder adjacent to the first end of the cylinder at a rate at least equal to the rate of increase of volume in the cylinder;

d. extending the piston with a high pressure to concentrate the magnesium into a self supporting pellet; and e. heating the magnesium pellets in a secondinert atmosphere to melt the pellets.

* * * * *